(12) United States Patent
Nasir et al.

(10) Patent No.: US 10,484,477 B2
(45) Date of Patent: Nov. 19, 2019

(54) INTERNET OF THINGS (IOT) DEVICE ACTIVATION AND MANAGEMENT

(71) Applicant: Verizon Patent and Licensing Inc., Arlington, VA (US)

(72) Inventors: Azim Nasir, Foxboro, MA (US); Andre R. Turner, New Providence, NJ (US); Daniel J. McKenna, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 205 days.

(21) Appl. No.: 14/983,717

(22) Filed: Dec. 30, 2015

(65) Prior Publication Data
US 2017/0195424 A1    Jul. 6, 2017

(51) Int. Cl.
*H04L 29/08* (2006.01)
*H04W 4/80* (2018.01)

(52) U.S. Cl.
CPC ............ *H04L 67/125* (2013.01); *H04L 67/10* (2013.01); *H04L 67/34* (2013.01); *H04L 67/36* (2013.01); *H04W 4/80* (2018.02)

(58) Field of Classification Search
CPC ... H04L 67/125; H04L 41/0806; H04L 67/10; H04L 67/34; H04L 67/36; H04W 4/80
USPC ........................................................ 709/206
See application file for complete search history.

(56) References Cited

U.S. PATENT DOCUMENTS

| | | | | |
|---|---|---|---|---|
| 7,054,924 B1* | 5/2006 | Harvey | ................ | H04L 67/303 709/203 |
| 2006/0271695 A1* | 11/2006 | Lavian | .................. | G06F 21/552 709/229 |
| 2013/0346504 A1* | 12/2013 | Huang | .................. | H04L 12/185 709/204 |
| 2014/0244001 A1* | 8/2014 | Glickfield | ............... | H04L 67/16 700/33 |
| 2014/0244833 A1* | 8/2014 | Sharma | ................... | H04L 67/16 709/224 |
| 2015/0347114 A1* | 12/2015 | Yoon | ......................... | G06F 8/61 235/375 |
| 2015/0365278 A1* | 12/2015 | Chakrabarti | ........ | H04L 41/0806 370/254 |
| 2016/0044032 A1* | 2/2016 | Kim | .................... | H04L 63/0876 726/5 |
| 2017/0033984 A1* | 2/2017 | Lear | ...................... | H04L 41/0803 |
| 2017/0126836 A1* | 5/2017 | Krishna | .................. | H04L 67/12 |
| 2017/0237815 A1* | 8/2017 | Arsenault | ............... | H04W 4/70 709/217 |

(Continued)

*Primary Examiner* — Thomas J Dailey
*Assistant Examiner* — Lam H Duong

(57) ABSTRACT

A user device, such as a smart phone, collects information about an Internet-of-things (IoT) device. The information may be obtained through a local wireless connection between the user device and the IoT device. The user device forwards, to an application server, a request to activate the IoT device over a service network, such as a wireless data network, and receives information for activating the IoT device. The user device uses the received information to activate the IoT device and collects data from the activated IoT devices. The user device may selectively report portions of the collected data to the application server, and may receive instruction updates. The user device may update the operation of the IoT device based on the received instruction updates.

20 Claims, 8 Drawing Sheets

(56) References Cited

U.S. PATENT DOCUMENTS

2017/0257341 A1* 9/2017 Arsenault ............... H04W 4/70

* cited by examiner

| IOT DATA TABLE 340 | | | | | | |
|---|---|---|---|---|---|---|
| IOT DEVICE IDENTIFIER | IOT DEVICE INFORMATION | | | | | APPLICATION SERVER ADDRESS |
| | MAKE AND MODEL | EQUIPMENT IDENTIFIER | | SENSOR | SECURITY CREDENTIAL | |

INTERNET OF THINGS (IOT) DEVICE ACTIVATION AND MANAGEMENT

BACKGROUND

Internet of Things (IoT) technology refers to a wide range of devices that can collect and forward data. Application servers process the collected data and determine actions for the IoT devices and other related devices. Since IoT technology has nearly limitless applications that can be leveraged to form new and useful services, interest among service providers and developers in IoT technology continues to increase. Activation and subsequent management of IoT devices may be problematic due to the large number and variety of IoT devices. For example, to register multiple IoT devices by different vendors, a user may need to access multiple different portals to set up multiple accounts having different passwords. Furthermore, after the IoT devices are activated, the user's IoT devices may forward sensor data to multiple different systems and locations, and the user may have difficulties managing the distribution of the IoT sensor data.

BRIEF DESCRIPTION OF THE DRAWINGS

FIG. 3B shows an exemplary IoT data table that may be maintained by the application in the user device included in the environment shown in FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
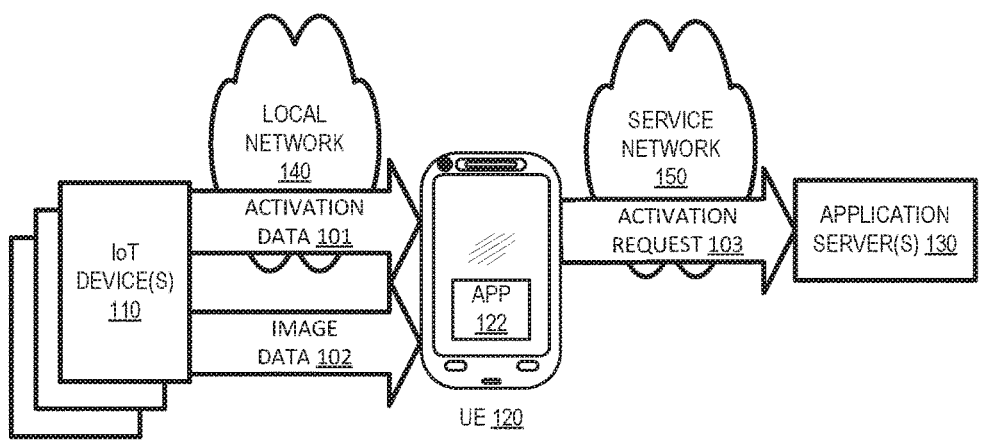
FIGS. 1A-1C show an exemplary overview of activating and managing Internet of Things (IoT) devices according to an implementation described herein.
Figure 1B:
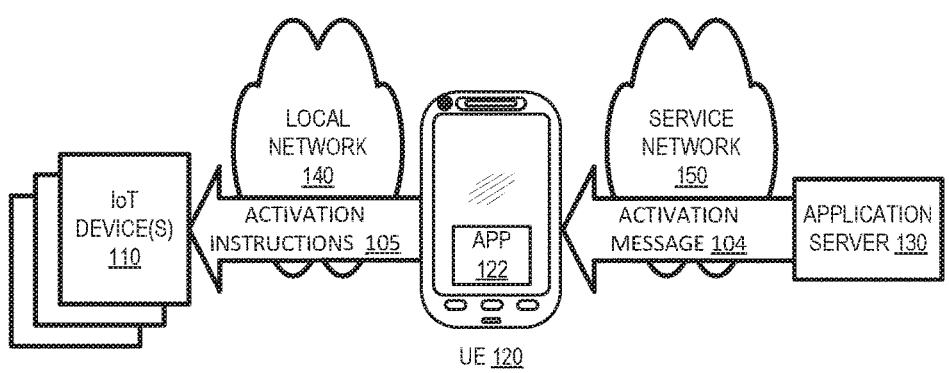
Figure 1C:
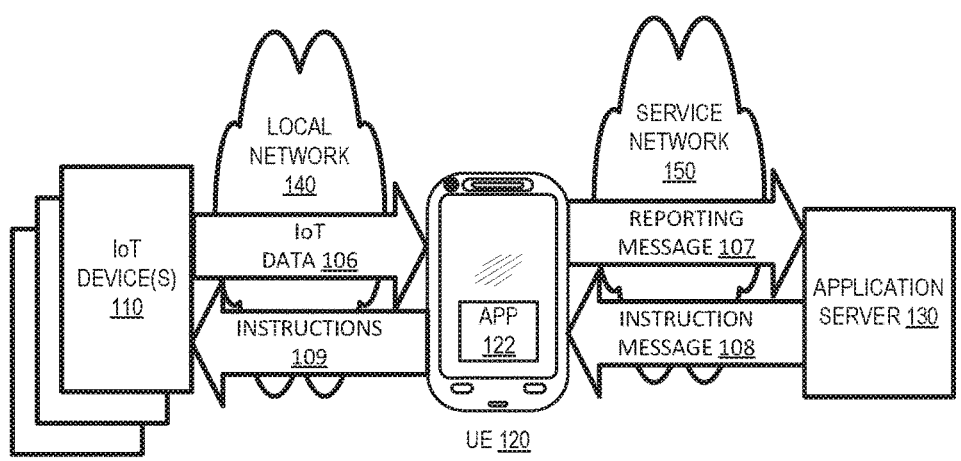

FIGS. 1A-1C show an exemplary overview of activating and managing Internet of Things (IoT) devices 110 by a user using a user equipment (UE) 120, such as a smartphone or a tablet, that is positioned near IoT devices 110. As shown in FIG. 1A, information regarding IoT devices 110 may be collected by UE 120. For example, UE 120 may receive activation data 101 from IoT devices 110 via a local network 140. Additionally or alternatively, UE 120 may capture image data 102 about IoT devices 110 and may use image data 102 to acquire activation data 101. As further shown in FIG. 1A, UE 120 may use the collected information to register IoT devices 110 with a remote application server 130. For example, UE 120 may send, via a service network 150, an activation request 103 forwarding at least a portion of activation data 101 to application server 130.

As used herein, the term "user" is intended to be broadly interpreted to include UE 120 or a person using UE 120. Also, the terms "user," "owner," "consumer," "subscriber," and/or "customer" are intended to be used interchangeably.

As shown in FIG. 1B, application server 130 may forward (e.g., via a service network 150) an activation message 104 that includes data and/or instructions that may be used by UE 120 to activate IoT devices 110. For example, UE 120 may forward activation instructions 105 via local network 140, and activation instructions 105 may cause IoT devices 110 to begin forming desired functions, such as collecting sensor data. As shown in FIG. 1C, UE 120 may subsequently receive (e.g., via local network 140) IoT data 106 collected by the activated IoT devices 110 and may forward a reporting message 107 that includes IoT data 106 and data associated with UE 120 to application server 130. Application server 130 may process reporting message 107 to identify actions to be performed by IoT devices 110, and may forward instructions message 108 to UE 120 via service network 150. UE 120 may identify a specific IoT device 110 to receive a portion of instruction message 108 and may forward the portion to the specific IoT device 110 via local network 140.

In this way, IoT devices 110 may be activated and managed without interfacing with application server 130 or accessing service network 150. Consequently, IoT devices 110 may have a more simplistic design (e.g., exclude an interface for communicating via service network 150) and may function in a more energy efficient manner to preserve battery power. Furthermore, the principles described herein enable UE 120 to control the operation of IoT devices 110 and to control transmission of data collected by IoT devices 110. Additionally, management of service network 150 is simplified since service network 150 would not need to maintain separate device profiles for each of the multiple IoT devices 110 associated with UE 120.

Returning to FIG. 1A, IoT device 110 may forward activation data 101 to UE 120. Activation data 101 may include information regarding IoT device 110 (e.g., a manufacturer and a model of IoT device 110, a serial number, a firmware or a software version, an equipment identifier such as a Media Access Control (MAC) address, security credentials, the number and type of sensors included with IoT device 110, etc.

For example, IoT device 110 may include near field communication (NFC) logic (e.g., an integrated circuit (IC), a chip, etc.), and IoT device 110 may use the NFC logic to forward activation data 101 to UE 120. The near field communication logic may operate in active and/or passive modes. In other examples, IoT device 110 may include another type of short-range communication logic for communicating with UE 120 via local network 140. For example, the short-range communication logic may be implemented as Bluetooth® (e.g., Bluetooth® Low Energy (BLE), Bluetooth® Classic, etc.), Wi-Fi, optical wireless (e.g., Infrared (IR) (e.g., legacy, second generation Infrared), etc.), radio frequency identification (RFID) technology, ZigBee, ZWave, ultra wideband (UWB), low frequency radio frequency (RF), another type of known or future generation communication technology, and/or a wired communication technology. In another example, IoT devices 110 may communicate with UE 120 using machine-to-machine (M2M) communications that automate data gathering operations and/or provide automatic data communications in support of a variety of other automated applications.

In one implementation, UE 120 may function to provide local network 140. For example, UE 120 may function as a "hot spot" to provide a local network 140 corresponding to wireless local area network (WLAN) at a geographic location or building (e.g., a home, a school, a business). IoT device 110 may connect to UE 120 and/or another IoT device 110 through local network 140 using a local (e.g., short-range) communications standard. For example, UE 120 may wirelessly communicate over short distances (e.g., within a few meters) with IoT devices 110 using radio signals (e.g., Bluetooth® as described in the Institute of Electrical and Electronics Engineers (IEEE) 802.15.1 standard or Wi-Fi as described in the IEEE 802.11 standard) and/or infrared signals (e.g., as described in Infrared Data Association (IrDA) standards).

Additionally or alternatively, UE 120 may include a sensor, such as a camera, for collecting image data 102 associated with IoT devices 110. For example, image data 102 may capture an equipment identifier such as a bar code, a serial number, a Federal Communications Commission (FCC) identifier, etc. displayed in IoT device 110.

As shown in FIG. 1A, UE 120 may include an application (or "app") 122 for activating and managing IoT devices 110. Application 122 (or another component of UE 120) may store activation data 101 and may associate activation data 101 with a unique identifier of IoT device 110. For example, application may associate IoT device 110 with a user-assigned identifier and/or an identifier that indicates a location, function, appearance, or other attribute of IoT device 110.

In certain implementations, application 122 may identify an application server 130 to receive activation request 103. For example, application 122 may store data associating different application servers 130 with different IoT devices 110. For example, application 122 may store and/or access data indicating that an application server 130 should receive activation requests 103 for IoT devices 110 from a certain manufacturer, having certain serial numbers, collecting certain types of sensor data, located in certain geographic locations, associated with certain UEs 120, etc.

In certain implementations, application 122 may identify application server 130 at least partially based on image data 102. For example, application 122 may perform image-to-text recognition and/or other processing of image data 102 to identify an equipment type or other information associated with IoT device 110, and application 122 may use this information to select an appropriate application server 130. Application 122 may further identify an address (e.g., an Internet protocol or media access control (MAC) address) for the selected application server 130 on service network 150.

Continuing with the overview in FIG. 1A, UE 120 may form and generate activation request 103 based on activation data 101 and/or image data 102. For example, application 122 may determine data needed by application server 130 to activate IoT device 110 and may further format this data for use by application server 130. For example, application 122 may obtain a blank form associated with application server 130, and application 122 may populate the blank form to generate activation request 103. For instance, application 122 may generate activation request 103 that includes: (1) the identifier (e.g., serial number) and/or other attributes of IoT device 110; (2) information regarding UE 120 (e.g., a network address on service network 150, an identifier for an associated user, billing information, contact information, etc.), and/or (3) an intended usage for IoT device 110.

UE 120 may forward activation request 103 over service network 150. For example, UE 120 may include longer range communications capabilities to access service network 150. For example, UE 120 may form a session with application server 130 via service network 150 based on a network address for application server 130 identified by application 122, and UE 120 may forward activation request 103 via the session. Service network 150 may include a wireless wide area network (WWAN) or other mobile data and communications networks, such as third generation (3G) and fourth generation (4G) (e.g., long-term evolution (LTE)) wireless access technologies. UE 120 may forward activation request 103 using the stored address to application server 130. If additional information is needed to activate IoT device 110, application server 130 may return an error message, and UE 120 may forward an amended activation request 103.

Turning now to FIG. 1B, application server 130 may process activation request 103. For example, application server 130 may parse activation request 103 to determine attributes of IoT device 110 and UE 120. Based on the contents of activation request 103, applicant server 130 may identify data and/or instructions to be used by IoT device 110 to perform functions (e.g., collecting desired data at particular times and reporting the collected data) for UE 120. For example, application server 130 may identify activation codes that, when received by IoT device 110, cause the IoT device to perform desired functions, such as collecting sensor data at given times. In another example, application server 130 may identify code, such as programming updates, for IoT device 110. Application server 130 may generate an activation message 104 that includes the identified data and/or programming code and may forward activation message 104 to UE 120. For example, application server 130 may form a session with UE 120 via service network 150 based on a network address for UE 120 included in activation request 103, and application server 130 may forward activation message 104 via the session.

As shown in FIG. 1B, application 122 may generate activation instructions 105 based on activation message 104. For example, application 122 may extract the data and/or code included activation message 104 and may generate activation instructions 105 that forward the data and/or code over local network 140 to relevant IoT devices 110. For example, IoT devices 110 may communicate over local network 140 using short messages (e.g., messages of less than 256 bytes) to minimize power consumption, and application 122 may generate activation instructions 105 that forward the extracted data and/or code from activation message 104 using the short messages. Furthermore, UE 120 may include, in activation instructions 105, a MAC address or other identifier for UE 120, and IoT device 110 may use the MAC address to communicate with UE 120 via local network 140. UE 120 may further customize the activation code/data within activation instructions 105. For example, UE 120 may selectively forward portions of activation instructions 105 to cause certain IoT devices 110 to perform certain functions at certain times, while omitting other portions of activation instructions 105 to cause other IoT devices to remain inactive until desired.

As shown in FIG. 1C, IoT devices 110 (after activation through the process shown in FIGS. 1A and 1B), may collect and forward IoT data 106 to UE 120 via local network 140. For example, IoT data 106 may identify the status of IoT device 110, actions performed by IoT device 110, sensor data collected by IoT device 110, etc. For example, IoT data 106 may identify a location of IoT device 110 relative to UE 120 and/or other IoT devices 110.

UE 120 may select portions of IoT data 106 to be forwarded to application server 130. For example, UE 120 may present a user interface (such as a graphical user interface, or "GUI") the enables a user of UE 120 to review IoT data 106 and select portions of IoT data 106 to be included in reporting message 107. For example, the user may prevent confidential information collected by IoT devices 110 from being forwarded to application server 130. UE 120 may further include other information in reporting message, such as information regarding UE 120, sensor data collected by other IoT devices 110, etc.

Application server 130 may process reporting message 107 to select actions to be performed by IoT devices 110 (e.g., modification to activation instructions 105) and may forward, via service network 150, instruction message 108 identifying the actions. UE 120 may parse instruction message 108 to identify actions to be performed by respective IoT devices 110, and may forward, via local network, instructions 109 to the IoT devices 110.

An example of the operations of UE 120 is now described with respect to an IoT device 110 associated with a parking meter. IoT device 110 may present a bar code or other identifier that may be captured by UE 120 and/or manually entered by a user. UE 120 may identify an associated application server 130 based on the bar code, and may forward, via a wireless data network, an activation request 103 that includes a bar code value or other identifier the IoT device 110, an MDN or other identifier for UE 120, and payment information. Applicant server 130 may process activation request 103 to charge a parking fee to UE 120, and may forward, to UE 120, an activation message 104 that includes a payment confirmation and activation code. UE 120 may forward, to IoT device 110, activation instructions 105 that include the activation code, and the activation code may cause IoT device 110 to perform certain functions, such as to display a visual indication confirming that the payment is received for a given time period. IoT device 110 may also provide additional information, such as an indication of whether the user's vehicle has been moved during the time period.

In this example, activation instructions 105 may further include instructions that guide IoT device 110 to connect with UE 120, such as identifying a Wi-Fi and/or Bluetooth® connection associated with UE 120. At the end of the time period, IoT device 110 may forward IoT data 106 to UE 120 indicating that an additional fee is required to park near IoT device 110, and UE 120 may forward this status information to application server 130 as reporting message 107. In reporting message 107, UE 120 may include additional payment information if additional parking time is desired, and application server 130 may forward instruction message 108 that include a new code that can be used by UE 120 to obtain credit for additional parking time.

The number of devices and/or networks, illustrated in FIGS. 1A-1C, is provided for explanatory purposes only. In practice, additional devices and/or networks, fewer devices and/or networks, different devices and/or networks, or differently arranged devices and/or networks than those illustrated in FIGS. 1A-1C may be used. Also, in some implementations, one or more of the displayed devices or networks may perform one or more functions described as being performed by another one or more of the other devices or networks. The devices and networks shown in FIGS. 1A-1C may interconnect via wired connections, wireless connections, or a combination of wired and wireless connections.

Figure 2:
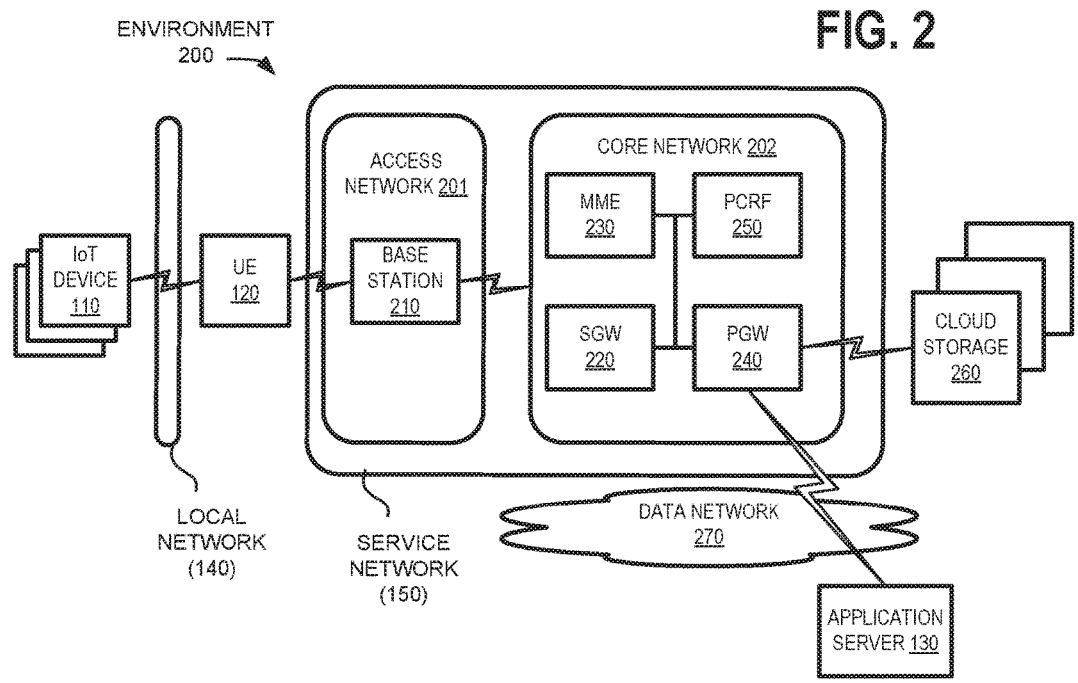
FIG. 2 shows an exemplary environment for activating and managing IoT devices.

FIG. 2 is a diagram illustrating an exemplary environment 200 in which an exemplary embodiment of activation and management of IoT devices 110 may be implemented. As shown in FIG. 2, environment 200 may include an access network 201 that connects UE 120 (e.g., through a base stations 210) to a core network 202 that controls communications between UE 120 and application server 130. For example, core network 202 may include a serving gateway (SGW) 220, a mobility management entity device (MME) 230, a packet data network (PDN) gateway (PGW) 240, and a policy and charging rules function device (PCRF) 250 that combine to enable and control access to cloud storage 260 and/or application server 130 (e.g., via a data network 270).

As previously described, IoT devices 110 may include logic that collects, obtains, and/or generates data. For example, IoT devices 110 may be implemented to include various technologies, such as a sensor, a tag, a camera, an antenna, etc, that collects, obtains, and/or generates IoT data. According to various implementations, IoT devices 110 may be a stationary device or a mobile device. IoT devices 110 may include a component (e.g., a Global Positioning System (GPS) chipset, etc.) that provides location-aware functionality. IoT devices 110 may be powered by an internal source, an external source, a battery, an outlet, electromagnetic waves, and so forth.

There are numerous types of IoT devices 110 available today, and an exhaustive treatment of the various types of IoT devices 110 is beyond the scope of this disclosure. Nevertheless, examples of IoT devices 110 include a meter (e.g., a utility meter, a parking meter, etc.), a sensor (e.g., a weather sensor, a traffic sensor, a home appliance sensor, an indoor environment sensor, etc.), a video camera (e.g., a security video camera, a video camera to capture social information at an establishment (e.g., number of persons in a bar, restaurant, etc.) etc.), a LoJack® device, a vehicle diagnosis device, a tag (e.g., to collect location data pertaining to public transportation vehicles (e.g., busses, subways, trains, public service vehicle, etc.), a dongle, a smartphone (e.g., to collect location data pertaining to a mobile device and/or its user), a medical device, etc.

UE 120 may include a communication device, such as a wireless mobile device that is capable of communicating with base station 210 and/or a network (e.g., local network 140). For example, UE 120 may include a cellular telephone, a smart phone, a laptop computer, a tablet computer, a camera, a personal gaming system, or another type of computation or communication device. In other implementations, UE 120 may include a set-top box (STB), a tablet, a gaming machine, a computer, a fitness tracker, a smart watch, smart glasses, or another peripheral and/or wearable device that may be used in connection with another UE 120.

Access network 201 includes one or multiple networks of one or multiple types. For example, access network 201 may be implemented to include a terrestrial network, a satellite network, a wireless network, and/or a wired network. According to an exemplary implementation, access network 201 includes a radio access network (RAN). The RAN may be a 3rd Generation (3G) RAN, a 3.5G RAN, a Fourth Generation (4G) RAN, a 4.5G RAN, a future generation wireless network architecture, etc. By way of further example, access network 201 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 201 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 201 may include a wired network. For example, access network 201 may include an optical network or a cable network.

Base station 210 may include one or more network devices that receive, process, and/or transmit traffic, such as audio, video, text, and/or other data, destined for and/or received from UE 120. In an example implementation, base station 210 may be an eNB device and may be part of the LTE network. Base station 210 may receive traffic from and/or send traffic to data network 270 via SGW 220 and PGW 240. Base station 210 may send traffic to and/or receive traffic from UE 120 via access network 201.

Core network 202 includes one or multiple networks of one or multiple types. For example, core network 202 may be implemented to include a terrestrial network, a satellite network, a wireless network, and/or a wired network. According to an exemplary implementation, core network 202 includes a complimentary network pertaining to the one or multiple RANs described above. For example, core network 202 may include the core part of an LTE network, an LTE-A network, etc. Depending on the implementation, core network 202 may include various network elements, such as a gateway, a support node, a serving node, a router, a switch, a bridge, as well other network elements pertaining to various network-related functions, such as billing, security, authentication and authorization, network polices, subscriber profiles, etc.

SGW 220 may include one or more network devices, such as a gateway, a router, a modem, a switch, a firewall, a network interface card (NIC), a hub, a bridge, a proxy server, an optical add-drop multiplexer (OADM), or another type of device that processes and/or transfers traffic. SGW 220 may, for example, aggregate traffic received from one or more base stations 210 and may send the aggregated traffic to application server 130 and/or cloud storage 260 via PGW 240. In one example implementation, SGW 220 may route and forward user data packets, may act as a mobility anchor for a user plane during inter-base station 210 handovers, and may act as an anchor for mobility between LTE and 3GPP or other technologies.

MME 230 may include one or more network devices that perform operations associated with a handoff to and/or from core network 202. MME 230 may perform operations to register UE 120 with core network 202 to handoff UE 120 from core network 202 to another network, to handoff UE 120 from the other network to core network 202 and/or to perform other operations. MME 230 may perform policing operations for traffic destined for and/or received from UE 120. MME 230 may also authenticate UE 120 (e.g., via interaction with PCRF 250) to establish the session between UE 120 and application server 130 and/or cloud storage 260.

PGW 240 may include one or more network devices, such as a gateway, a router, a modem, a switch, a firewall, a NIC, a hub, a bridge, a proxy server, an optical add/drop multiplexor (OADM), or another type of device that processes and/or transfers traffic. PGW 240 may, for example, provide connectivity of UE 120 to data network 270 by serving as a traffic exit/entry point for UE 120. PGW 240 may perform policy enforcement, packet filtering, charging support, lawful intercept, and/or packet screening. PGW 240 may also act as an anchor for mobility between 3GPP and non-3GPP technologies.

PCRF 250 may include one or more devices that provide policy control decisions and flow based charging control functionalities. PCRF 250 may provide network control regarding service data flow detection, gating, quality of service (QoS) and flow based charging, etc. PCRF 250 may determine how a certain service data flow shall be treated, and may ensure that user plane traffic mapping and treatment are in accordance with a user's subscription profile. For example, PCRF 250 may identify and apply a user profile related to UE 120 when transmitting a message to cloud storage 260 and/or application server 130.

In one implementation, a component (e.g., SGW 220) of core network 202 may receive data (e.g., application request 103) being transmitted by UE 120 to application server 130. A component of core network 202 (e.g., MME 230) may parse the received data to identify UE 120. PCRF 250 may maintain data associating cloud storage 260 with UE 120. A component of core network 202 (e.g., PGW 240) may store a copy of the message from UE 120 and/or data included in the message to the associated cloud storage 260. Cloud storage 260 may store data identifying IoT devices 110 being managed by UE 120 (e.g., from activation request 103) and may further store instructions and/or data received from application server 130 (e.g., from activation message 104 and/or instruction message 108).

In certain implementations, cloud storage 260 may store data associated with IoT devices 110 managed by multiple UEs 120. When a UE 120 detects a new IoT device 110, UE 120 may interface with cloud storage 260 to identify an application server 130 associated with the discovered IoT device 110. For example, UE 120 may forward attributes of the discovered IoT device 110, and cloud storage 260 may identify application servers 130 that manage similar IoT devices 110 for other UEs 120.

Data network 270 may include one or more wired and/or wireless networks. For example, data network 270 may include the Internet, a public land mobile network (PLMN), and/or another network. Additionally, or alternatively, data network 270 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The number of devices and/or networks, illustrated in FIG. 2, is provided for explanatory purposes only. In practice, environment 200 may include additional devices and/or networks, fewer devices and/or networks, different devices and/or networks, or differently arranged devices and/or networks than those illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
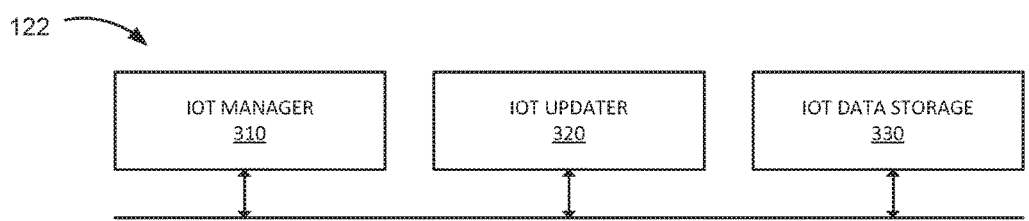
FIG. 3A shows exemplary elements of an application in a user device included in the environment shown in FIG. 2.

FIG. 3A is a diagram illustrating exemplary elements of application 122 according to one implementation. For example, as shown in FIG. 3, application 122 may include an IoT manager 310, an IoT updater 320, and an IoT data storage 330.

IoT manager 310 may obtain and modify data regarding IoT devices 110 to, for example, activate and control IoT devices 110. For example, IoT manager 310 may communicate with IoT device 110 and may read and write activation data/code to a memory/storage of IoT device 110. In one implementation, IoT manager 310 may include a graphical user interface that allows a user of UE 120 to enter new IoT information, edit existing IoT information, and read IoT information stored at UE 120. When IoT device 110 includes a passive communication interface (e.g., NFC logic, RFID, etc.), IoT manager 310 may perform these tasks while IoT device 110 is turned off (e.g., before IoT device 110 is activated). Alternatively, when IoT device 110 does not include a passive communication interface, IoT manager 310 may perform these tasks while IoT device 110 is turned on (e.g., before IoT device 110 is activated). Additionally or alternatively, IoT manager 310 may communicates with application server 130 to upload IoT information pertaining to IoT device 110. IoT manager 310 may further cause data regarding IoT devices 110 to be stored to IoT data storage 330.

IoT updater 320 may manage the updating of IoT devices 110. For example, IoT updater 320 may obtain (e.g., from application server 130) software, firmware, or other types of updates pertaining to activating and managing IoT devices 110 and may store the information to IoT data storage 330. According to another exemplary implementation, IoT updater 320 may obtain updates from a third-party (such as a website) and may store uniform resource identifiers (URIs) or other identifiers for the third parties to IoT data storage 330. In one implementation, IoT updater 320 may present data regarding available updates to a user of UE 120 and may enable the user to select and download certain updates pertaining to IoT devices 110. IoT updater 320 also allows the user to control when the updates are installed to IoT devices 110 (e.g., to control when UE 120 established a connection with IoT device 110 via local network 140).

IoT data storage 330 may store data regarding IoT devices 110 activated and/or managed by UE 120. According to an exemplary embodiment, IoT data storage 330 may store and manage a database including data about IoT devices 110. For example, IoT data storage 330 includes logic of a database management system (DBMS). The DBMS may be implemented using conventional, well-known, or commercially available software/packages (e.g., Microsoft SQL, Oracle Database, etc.). IoT data storage 330 may store the data about IoT devices 110 in a database.

By way of example, referring to FIG. 3B, IoT data storage 330 may maintain an IoT data table 340. As illustrated in FIG. 3B, IoT data table 340 may include an IoT device identifier field 342, IoT device information fields 344, and an application server address field 346. According to other implementations, IoT data table 340 may include additional instances of data, fewer instances of data, and/or different types of data. For example, according to other exemplary implementations, IoT data table 340 may include a state field that indicates whether an IoT device 110 has not been activated. IoT data table 340 may include profiles 350-1 through 350-Z (also referred to as profiles 350 and, individually and generically as profile 350). Each profile 350 pertains to a different IoT device 110.

IoT device identifier field 342 may store an identifier for IoT device 110. For example, UE 120 may enable a user to assign a name or other form of a string to IoT device 110. For example, the data in IoT device identifier field 342 may correspond to a location, sensor type, function, etc. associated with IoT devices 110. The identifier in IoT device identifier field 342 may be different than an equipment identifier, as described herein. Additionally or alternatively, IoT device identifier field 342 may store addresses (e.g., MAC addresses) for IoT devices on local network 140.

IoT device information field s 344 may store various instances of data pertaining to IoT device 110. For example, IoT device information fields 344 may store data that indicates the make and model of IoT device 110, an equipment identifier (e.g., a bar code value, a serial number, a Federal Communications Commission (FCC) identifier, etc.), a firmware or software version installed on IoT device 110, security credentials, location information of IoT device 110, the number and type of sensors included with IoT device, whether a sensor has been calibrated, etc.

Application server address field 346 may store data identifying an application server 130 associated with a given IoT device 110. For example, application server address field 346 may store an IP address or other data that may be used to direct messages to application server 130 via service network 150.

The number of elements illustrated in FIG. 3A is provided for explanatory purposes only. In practice, application 122 may include additional elements, fewer elements, different elements, or differently arranged elements than those illustrated in FIG. 3A. Also, in some implementations, one or more of elements of application 122 may perform one or more functions described as being performed by another element of application 122.

Figure 4:
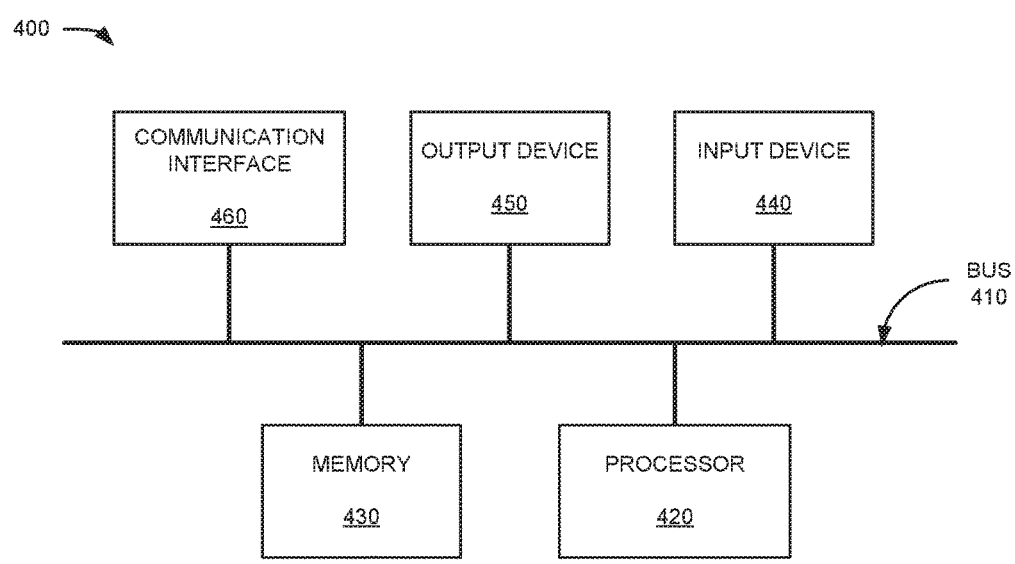
FIG. 4 shows a diagram of exemplary components that may be included in a computing device included in the environment shown in FIG. 2.

FIG. 4 is a diagram illustrating exemplary components of a computing device 400. IoT device 110, UE 120, application server 130, base station 210, SGW 220, MME 230, PGW 240, PCRF 250, and/or cloud storage 260 may include one or more computing devices 400 and/or one or more components of computing device 400. As shown in FIG. 4, computing device 400 may include a bus 410, a processor 420, a memory 430, an input device 440, an output device 450, and a communication interface 460.

Bus 410 may include a path that permits communication among the components of computing device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420.

Input device 440 may include a mechanism that permits a user to input information to computing device 400, such as a keyboard, a keypad, a button, a switch, etc. Output device 450 may include a mechanism that outputs information to the user, such as a display (e.g., a liquid crystal display), a speaker, one or more light emitting diodes (LEDs), etc. Communication interface 460 may include a transceiver mechanism that enables computing device 400 to communicate with other devices and/or systems via wireless communications, wired communications, or a combination of wireless and wired communications. For example, communication interface 460 may include mechanisms for communicating with another device or system via a network. Alternatively or additionally, communication interface 460 may be a logical component that includes input and output ports, input and output systems, and/or other input and output components that facilitate the transmission of data to other devices.

Computing device 400 may perform certain operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein.

Alternatively, hardwired circuitry may be used in place of or in combination with software instructions to implement processes described herein. Thus, implementations described herein are not limited to any specific combination of hardware circuitry and software.

FIG. 4 shows exemplary components of computing device 400. In other implementations, computing device 400 may contain fewer components, additional components, different components, or differently arranged components than those depicted in FIG. 4. For example, computing device 400 may include one or more switch fabrics instead of, or in addition to, bus 410. In another example, in some implementations, a display may not be included in computing device 400, and in these situations, computing device 400 may be a "headless" device that does not include input device 440. Additionally or alternatively, one or more operations described as being performed by a particular component of computing device 400 may be performed by one or more other components, in addition to or instead of the particular component of computing device 400.

Figure 5:
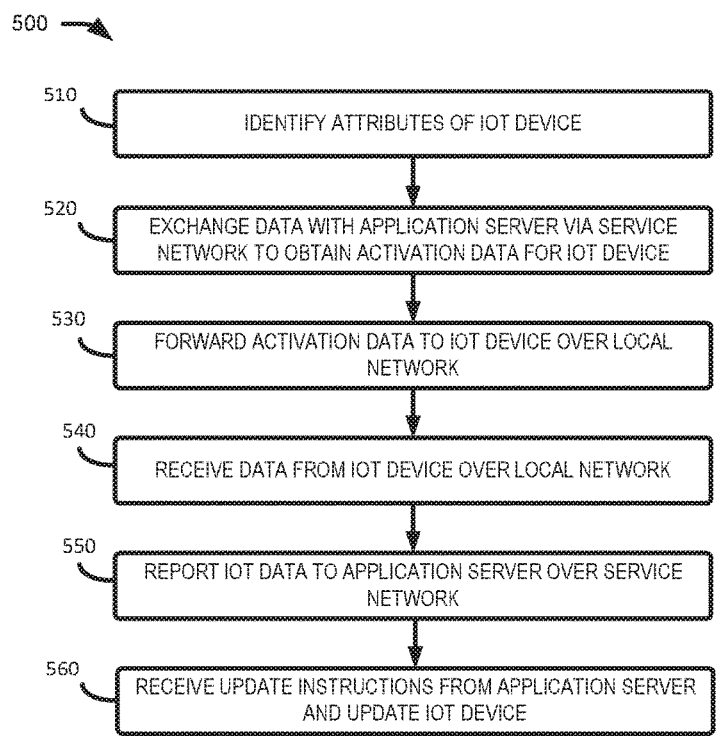
FIG. 5 is a flow diagram illustrating an exemplary process for activating and managing an IoT device in the environment shown in FIG. 2.

FIG. 5 is a flow diagram illustrating an exemplary process 500 for activating and managing one or more IoT devices 110. In one implementation, process 500 may be performed by UE 120. In other implementations, portions of process 500 may be performed by application server 130 or another component of environment 200.

As shown in FIG. 5, process 500 may include identifying an attribute of an IoT device 110 (block 510). For example, UE 120 may communicate with IoT device 110 over local network 140 (e.g., a Wi-Fi network or a Bluetooth® channel) to obtain activation data 101 regarding IoT device 110. Additionally or alternatively, UE 120 may capture image data 102 regarding IoT device 110. For example, UE 120 may capture an image a bar code of IoT device 110 and may analyze this data to determine a value associated with the bar code.

As shown in FIG. 5, process 500 may further include UE 120 communicating with application server 130 via service network 150 to obtain activation data for IoT device 110 (block 520). For example, UE 120 may generate an activation request 103 based on activation data 101 and/or image data 102. UE 120 may also determine a location associated with IoT device 110, other IoT devices 110 at the same geographic location (e.g., other IoT devices 110 communicating with UE 120 via local network 140), a status of IoT device 110 (e.g., whether IoT device 110 is activated by another UE 120), environmental conditions associated with UE 120 (e.g., a temperature, ambient light levels, ambient sound levels, atmospheric moisture levels, etc.), and UE 120 may include this type of information in activation request 103. Activation request 103 may further include information, such as a password, account number, etc., that may be used by application server 130 to verify that activation request 103 is received from an authorized used. For example, application server 130 may interact with core network 202 to verify that credential for UE 120, included in activation request 103, are correct. Application server 130 may identify data and/or code to be used to activate IoT device, and application server 130 may include this data and/or code in activation message 104. UE 120 may receive activation message 104 via service network 150.

In one implementation, UE 120 may store a portion of activation message 104 to cloud storage 260. If UE 120 is lost or has a malfunction, UE 120 (or another device) may obtain the stored portions of activation message 104 from cloud storage 260, and UE 120 may use the obtained portion of activation message 104 to activate IoT device 110.

As shown in FIG. 5, UE 120 may forward activation instructions 105 to IoT device 110 over local network 140 (block 530). For example, UE 120 may extract relevant portions of activation message 104 (e.g., code and/or data for a particular IoT device 110) and may forward the portions of activation message 104 to the particular IoT device 110. Additionally UE 120 may modify the activation message based on a user input. For example, UE 120 may provide a GUI that enables a user to use contents of activation message 104 to selectively activate certain IoT devices 110 during a given time period. For example, UE 120 may wait to activate IoT device 110 until a user input is received. Similarly, UE 120 may selectively deactivate the IoT device 110 when desired (e.g., when another user input is received). UE 120 may further provide through the GUI, an indication of whether IoT device 110 is currently activated and whether IoT device 110, when inactive, can be activated by UE 120.

In one implementation, UE 120 may further identify, in activation message 104, an alternative device (e.g., another UE 120 and/or a portal, such as router, computer, set-top box, etc.) to receive data (e.g., IoT data 106) from IoT device 110 in given situations. For example, UE 120 may instruct IoT device 110 to forward sensor data to another device during certain time periods. In another example, UE 120 may instruct IoT device 110 to forward sensor data to the other device if UE 120 is not in communications with IoT device 110 (e.g., UE 120 is not connected to local network 140). In yet another example, UE 120 may instruct IoT device 110 to forward sensor data to the other device if the sensor data include certain content (e.g., IoT device 110 detects conditions associated with an emergency condition). For example, UE 120 may instruct IoT device 110 in a vehicle to forward a notification via M2M communications to an application server associated with emergency assistance if a crash is detected (e.g., the vehicle decelerates suddenly). In this type of emergency situation, IoT device 110 may receive temporary credentials to access service network 150 to forward a request for emergency assistance.

As shown in FIG. 5, process 500 may also include receiving IoT data 106 from the activated IoT device 110 over local network 140 (block 540), and reporting the IoT data to application server over service network (block 550). For example, IoT device 110 may forward, as IoT data 106, collected sensor reading via local network 140 to UE 120. In one implementation, UE 120 may provide a GUI that enables a user to specify portions of IoT data 106 to be forwarded as reporting message 107 to application server 130. The user may also specify when to forward reporting message 107. For example, UE 120 may receive an input specifying that the reporting message 107 should be transmitted during a non-peak time on service network 150. Reporting message 107 may further include additional information, such as a status of UE 120 and/or other IoT devices. In one implementation, UE 120 may receive multiple transmissions from IoT device 110 forwarding IoT data 106, and IE 120 may aggregate the IoT data 106 into a single reporting message 107. For example, UE 120 may receive periodic reports forwarding sensor data collected by IoT device 110 over a given time period (e.g., receiving hourly sensor reading collected by IoT device 110 during a week), and at the end of the time period (e.g., at the end of the week), UE 120 may generate and forward generate message 107 identifying the aggregated sensor data collected during the time period.

In one implementation, UE 120 may store portions of IoT data 106 (e.g., portions selected by a user) to cloud storage 260. If UE 120 is lost or has a malfunction, application server 130 may obtain the stored portions of IoT data 106 from cloud storage 260.

UE 120 may receive update instructions from application server 130 and may update IoT device 110 (block 560). For example, application server 130 may generate instructions message 108 based on reporting message 107, and instructions message 108 may include updates for IoT device 110. For example, instructions message 108 may identify actions to be performed by IoT device 110 based on collected IoT data 106 and/or the status of UE 120 identified in reporting message 107.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 5, the order of the blocks in process 500 may be modified in other implementations. Furthermore, non-dependent blocks may be performed in parallel. Furthermore, process 500 may include additional and/or fewer blocks than shown in FIG. 5.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
    identifying, by a processor associated with a user device, an attribute of an Internet-of-things (IoT) device;
    forwarding, by the processor, the attribute to a cloud storage, wherein the cloud storage stores data identifying IoT devices associated with the user device and data associated with IoT devices associated with other user devices, and wherein the cloud storage identifies an application server, from a plurality of application servers, that manages similar IoT devices for the other user devices, wherein the similar IoT devices include IoT devices with attributes similar to the attribute;
    obtaining, by the processor, a form associated with the application server;
    populating, by the processor, the form to generate an activation request based on the attribute of the IoT device, wherein the activation request relates to activating the IoT device, and wherein the activation request includes the attribute of the IoT device, information associated with the user device, and an intended usage for the IoT device;
    forwarding, by the processor, the activation request to the application server, wherein the activation request is forwarded via a service network;
    receiving, by the processor and from the application server, activation information for activating the IoT device;
    storing, by the processor, the activation information to the cloud storage;
    activating, by the processor, the IoT device by forwarding the activation information to the IoT device, wherein the activation information is not sent through the service network, and wherein the activation information includes an indication of a second device to receive data from the IoT device during particular time periods or when the user device is not in communication with the IoT device;
    receiving, by the processor, data collected by the activated IoT device;
    generating, by the processor, a reporting message based on the data collected by the activated IoT device;
    receiving, by the processor and from a user of the user device, an indication of a particular time when the reporting message should be forwarded to the application server; and
    forwarding, by the processor, the reporting message to the application server via the service network at the particular time.

2. The method of claim 1, wherein generating the reporting message further includes:
    providing a user interface (UI), wherein the UI presents portions of the data collected by the activated IoT device;
    receiving, through the UI, a user input selecting one of the portions of the data collected by the activated IoT device; and
    including the selected one of the portions of the data collected by the activated IoT device in the reporting message, wherein the reporting message excludes non-selected ones of the portions of data collected by the activated IoT device.

3. The method of claim 1, wherein generating the reporting message further includes:
    identifying a status of the user device; and
    including, in the reporting message, information identifying the status of the user device.

4. The method of claim 1, wherein generating the reporting message further includes:
    receiving, by the processor, data collected by another IoT device; and
    including, in the reporting message, at least a portion of the data collected by the other IoT device.

5. The method of claim 1, wherein the activation information is received during a first time period, and wherein forwarding the activation information to the IoT device further includes:
    storing the activation information during the first time period;
    receiving a user input during a second time period that is after the first time period; and forwarding the activation information to the IoT device during the second time period based on receiving the user input.

6. The method of claim 1, wherein forwarding the activation information to the IoT device further includes:
providing a user interface (UI), wherein the UI presents the activation information;
receiving, through the UI, a user input identifying a modification to the activation information; and
forwarding the modification to the activation information to the IoT device.

7. The method of claim 6, wherein the modification identifies an emergency situation, and wherein the modification causes the IoT device to forward a notification to the application server when the emergency situation is detected.

8. The method of claim 1, wherein identifying the attribute of the IoT device includes:
capturing an image of the IoT device; and
processing the image to determine the attribute of the IoT device.

9. The method of claim 1, wherein identifying the attribute of the IoT device includes:
establishing a short-range connection between the user device and the IoT device; and
obtaining data identifying the attribute from the IoT device.

10. A device comprising:
a memory to store one or more instructions;
a first wireless interface to communicate via a local network;
a second wireless interface to communicate via a service network that differs from the local network; and
a processor configured to execute the one or more instructions to:
identify an attribute of an Internet-of-things (IoT) device that differs from the device;
forward, to a cloud storage, the attribute, wherein the cloud storage stores data identifying IoT devices associated with the device and data associated with IoT devices associated with other devices, and wherein the cloud storage identifies an application server, from a plurality of application servers, that manages similar IoT devices for the other devices, wherein the similar IoT devices include IoT devices with attributes similar to the attribute;
obtain a form associated with the application server;
populate the form to generate an activation request based on the attribute of the IoT device, wherein the activation request relates to activating the IoT device, and wherein the activation request includes the attribute of the IoT device, information associated with the device, and an intended usage for the IoT device;
forward the activation request to the application server using the second wireless interface;
receive, from the application server and using the second wireless interface, activation information for activating the IoT device;
store the activation information to the cloud storage;
activate the IoT device by forwarding, using the first wireless interface, the activation information to the IoT device, wherein the activation information includes an indication of a second device to receive data from the IoT device during particular time periods or when the device is not in communication with the IoT device;
receive, using the first wireless interface, data collected by the activated IoT device;
generate a reporting message based on the data collected by the activated IoT device;
receive from a user associated with the device an indication of a particular time when the reporting message should be forwarded to the application server; and
forward, using the second wireless interface, the reporting message to the application server at the particular time.

11. The device of claim 10, wherein the processor, when generating the reporting message, is further configured to:
provide a user interface (UI), wherein the UI presents portions of the data collected by the activated IoT device;
receive, through the UI, a user input selecting one of the portions of the data collected by the activated IoT device; and
include the selected one of the portions of the data collected by the activated IoT device in the reporting message, wherein the reporting message excludes non-selected ones of the portions of the data collected by the activated IoT device.

12. The device of claim 10, wherein the processor, when generating the reporting message, is further configured to:
identify a status of the device; and
include, in the reporting message, information identifying the status of the device.

13. The device of claim 10, wherein the processor, when generating the reporting message, is further configured to:
receive, via the first wireless interface, data collected by another IoT device; and
include, in the reporting message, at least a portion of the data collected by the other IoT device.

14. The device of claim 10, wherein the activation information is received during a first time period, and wherein the processor, when forwarding the activation information to the IoT device, is further configured to:
store the activation information during the first time period;
receive a user input during a second time period that is after the first time period; and
forward the activation information to the IoT device during the second time period based on receiving the user input.

15. The device of claim 10, wherein the processor, when forwarding the activation information to the IoT device, is further configured to:
provide a user interface (UI) presenting the activation information;
receive, through the UI, a user input identifying a modification to the activation information; and
forward the modification to the activation information to the IoT device.

16. The device of claim 15, wherein the modification identifies an emergency situation, and wherein the modification causes the IoT device to forward a notification to the application server when the emergency situation is detected.

17. The device of claim 10, wherein the processor, when identifying the attribute of the IoT device, is further configured to:
capture an image of the IoT device; and
process the image to determine the attribute of the IoT device.

18. The device of claim 10, wherein the processor, when identifying the attribute of the IoT device, is further configured to:
    establish using the first wireless interface, a connection between the device and the IoT device; and
    obtain, via the connection, data identifying the attribute from the IoT device.

19. A non-transitory computer-readable medium to store instructions, the instructions comprising:
    one or more instructions that when executed by a processor associated with a user device, cause the processor to:
        identify an attribute of an Internet-of-things (IoT) device;
        forward the attribute to a cloud storage, wherein the cloud storage stores data identifying IoT devices associated with the user device and data associated with IoT devices associated with other user devices, and wherein the cloud storage identifies an application server, from a plurality of application servers, that manages similar IoT devices for the other user devices, wherein the similar IoT devices include IoT devices with attributes similar to the attribute;
        obtain a form associated with the application server;
        populate the form to generate an activation request, wherein the activation request identifies the user device and the attribute of the IoT device, and wherein the activation request includes the attribute of the IoT device, information associated with the user device, and an intended usage for the IoT device;
        forward the activation request to the application server, wherein the activation request is forwarded via a service network;
        receive, from the application server and via the service network, activation information for activating the IoT device;
        store the activation information to the cloud storage;
        activate the IoT device by forwarding the activation information to the IoT device, wherein the activation information is not sent through the service network, and wherein the activation information includes an indication of a second device to receive data from the IoT device during particular time periods or when the user device is not in communication with the IoT device;
        receive data collected by the activated IoT device;
        generate a reporting message based on the data collected by the activated IoT device;
        receive an indication of a particular time when the reporting message should be forwarded to the application server; and
        forward the reporting message to the application server via the service network at the particular time.

20. The non-transitory computer-readable medium of claim 19, wherein the instructions cause the processor, when generating the reporting message, to:
    provide a user interface (UI), wherein the UI presents portions of the data collected by the activated IoT device;
    receive, through the UI, a user input selecting one of the portions of the data collected by the activated IoT device; and
    include the selected one of the portions of the data collected by the activated IoT device in the reporting message, wherein the reporting message excludes non-selected ones of the portions of data collected by the activated IoT device.

* * * * *